Patented Mar. 11, 1941

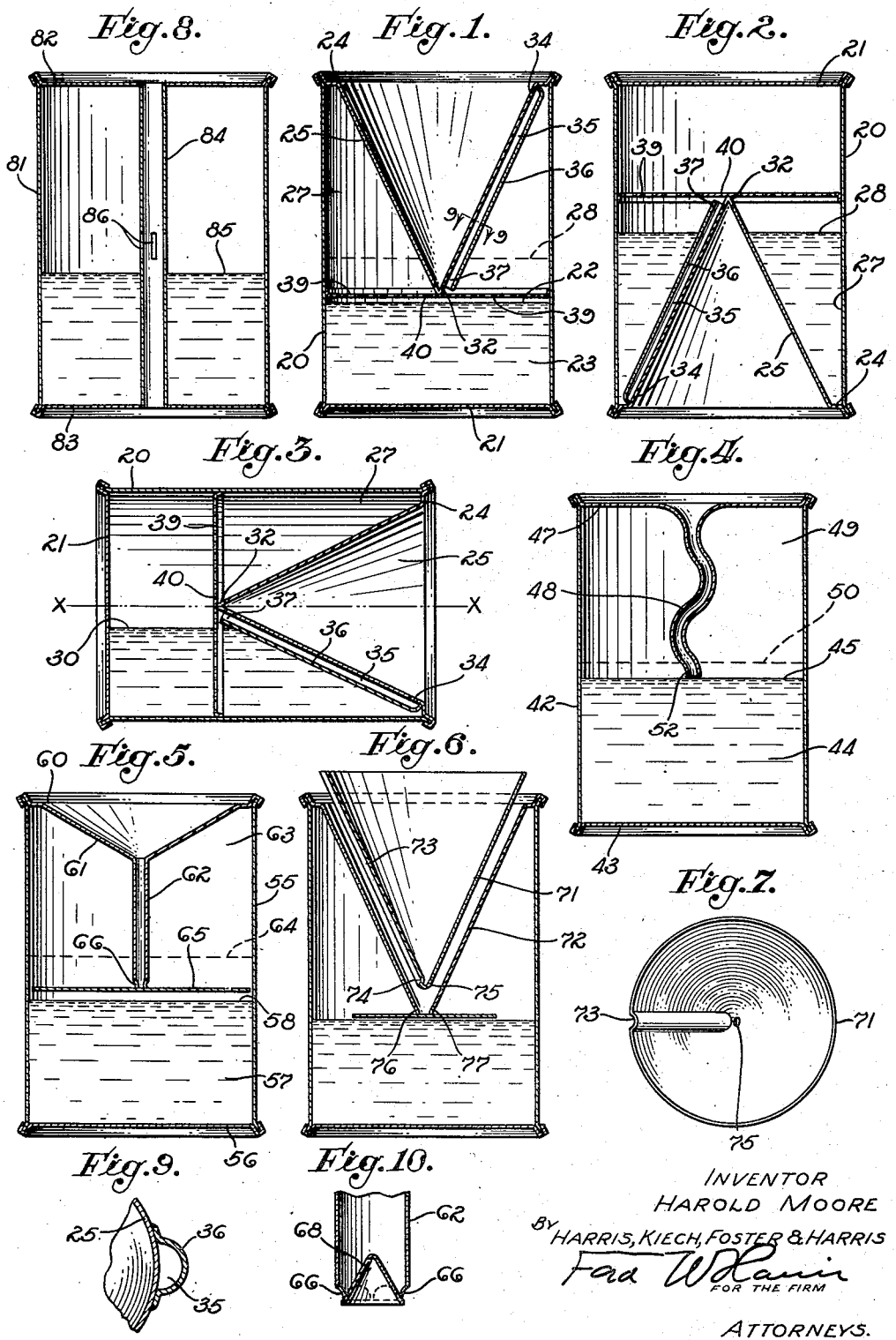

2,234,500

UNITED STATES PATENT OFFICE 2,234,500

INSECTICIDE DISPENSER

Harold Moore, Fullerton, Calif.

Application October 31, 1938, Serial No. 237,906

4 Claims. (Cl. 43—121)

My invention relates to insecticide devices, with particular reference to dispensers for insecticide substances. Since my invention is applicable with outstanding advantages to containers for substances to poison ants, I elect such an embodiment for my specific disclosure, but those skilled in the art will readily appreciate that the invention will have other uses and may take other forms than shown herein.

Insecticides found to be most effective for destroying ants and most widely used around households for that purpose are substances that are also toxic to human beings and domestic animals. Dispensing devices containing such substances may, therefore, be serious hazards. They may be accidentally overturned to spill their contents. Exposure to weather may obliterate labels and make poison symbols illegible. Small children, of course, cannot read labels nor understand the danger presented. The containers are small enough to be handled as toys and when so handled by children are turned haphazardly to various positions tending to spill out the contents. The small entrances for insects suggest to children the procedure of inserting sticks, twigs or like objects into the container so that if the poisonous substance is not spilled in handling, it may be extracted by adherence to such inserted objects. Unfortunately, sugar or other sweetening is added to attract ants and a child obtaining one taste of the substance accidentally will thereupon aggressively seek further indulgence, possibly with serious effects.

With the above hazards in mind, I have as a general object of my invention the provision of a dispensing receptacle or insecticide that will permit access to its poisonous contents only by insects. More specifically, one object of my invention is to provide a dispensing container that will retain its contents at all abnormal positions of the container and will provide an entrance for insects that will not admit elongated objects such as sticks, twigs and the like.

In one form of my invention I provide wall or baffle means within the container adjacent the insect port to prevent admission along a rectilinear path, a feature of such a provision being that the baffle or wall means so employed also may serve both to divert the poisonous contents from the insect port when the container is turned over or shaken, and also as a runway by which the ants may more readily reach the surface of the poisonous liquid.

My invention is characterized by the conception of a container with re-entrant walls providing an insect port in a location centrally of the container whereby the enclosed substance at all possible positions of the container will gravitate into liquid-confining spaces below the level of said port. In one form of my invention I provide an air vent having an intake port substantially at the level of the insect port when the container is in upright position to facilitate initial introduction of the poisonous substance into the container through the insect port. Since the intake port of the air vent will be substantially at the level of the insect port at the normal position of the container, the intake port will be above the surface of the liquid at all positions of the container. When the re-entrant walls are used as a funnel for filling the container, the position of the air vent intake port is such as to shut off the escape of air when the liquid rises in the container to the level of the vent port, thereby preventing rise of the liquid to a higher level at which it will find exit by gravity when the container is inverted or placed upon its side.

One object of my invention is to design such a vent in a manner to prevent the poisonous substance from escaping therethrough at abnormal positions of the container. A feature of my invention is that this object is attained by making this vent small enough to prevent escape of the poisonous substance without precluding its intended function as a vent. Another feature of my invention is the conception of providing walls forming a vent passage which will dam off the substance from the vent port whenever the container is turned to a position placing the vent port below the substance level.

The above and other objects and advantages of my invention will be apparent in my more detailed description to follow, taken with the accompanying drawing.

In the drawing:

Fig. 1 is a vertical sectional view of a container embodying my invention, the container being shown in its normal upright position.

Fig. 2 is a view similar to Fig. 1 with the container turned upside down.

Fig. 3 is a view similar to Fig. 1 with the container lying on its side.

Fig. 4 is a section similar to Fig. 1 showing another form of my invention.

Fig. 5 is a vertical section similar to Figs. 1 and 4 showing a third form of my invention.

Fig. 6 is a vertical section of a fourth form of my invention, showing the funnel in raised position.

Fig. 7 is a top plan view of the separable funnel shown in Fig. 6.

Fig. 8 is a vertical section of a fifth form of my invention.

Fig. 9 is an enlarged fragmentary horizontal section taken along the line 9—9 of Fig. 1.

Fig. 10 is a fragmentary vertical section of a modified form of baffle plate.

A container constructed in accordance with the teachings of my invention may be fabricated from glass, metal, or other materials and may have various shapes. The containers shown in the drawing by way of example are of sheet metal construction to be manufactured in the same manner as ordinary sheet metal cans.

The particular container shown in Figs. 1 to 3 has a cylindrical side wall 20 and a bottom 21. Since in the normal upright position of the receptacle shown in Fig. 1, the poisonous contents gravitate towards the bottom 21 forming a maximum substance level as indicated, for example, at 22, the lower end of the receptacle designated 23 may be termed the "normal reservoir" for the poisonous contents.

The upper end of the container is closed by a top 24 that provides a conical re-entrant wall 25, the re-entrant wall being in effect continuous with the side wall 20 to form therewith a secondary reservoir 27. This secondary reservoir has at least as much capacity as the normal reservoir 23, so that when the container is in the reverse position indicated in Fig. 2, the substance level will form, for example at the line 28.

It is contemplated that the volume of the poisonous contents will be substantially less than half the internal volume of the container so that when the container is tipped over onto its side, as shown in Fig. 3, the substance extending longitudinally into both the normal reservoir and the secondary reservoir will form a substance level 30 substantially below the axis X—X of the container.

The container being constructed as shown and holding the suggested volume of poisonous substance will have a central space below which the body of poisonous substance will lie at all positions of the container. The re-entrant wall 25 extends into this central space and is provided therein with an insect port or entrance 32 that will, of course, always be at or above the poisonous substance level.

It is contemplated that the poisonous substance will be a relatively viscous syrup, but it will be readily understood that the invention will be effective with relatively fluent liquid and with substances in powder or granulated form. To facilitate the original introduction of the poisonous substance into the container through the insect port 32, it is desirable to provide some kind of a vent for releasing air displaced by the substance, especially if the substance is in liquid form. The vent means of Figs. 1 to 3 includes a vent port 34 in the re-entrant wall 25 at a location to be above the insect port 32 when the container is in its normal upright position. It will be noted that the conical re-entrant wall 25 constitutes a funnel for filling the container and that by virtue of the vent port 34, even a relatively viscous liquid will gravitate from the funnel-shaped entrance through the insect port 32.

To prevent the poisonous substance from passing outward through the vent port at the various abnormal positions of the container, I provide a vent passage 35 formed by a U-shaped wall 36 that is attached to the re-entrant wall 25 in a fluid-tight manner as best shown in Fig. 9. The inner end or intake port 37 of the vent passage 35 lies in the aforementioned centralized space of the container that is above the substance level at all conceivable positions of the container. It will be apparent, then, that at no position of the container will the poisonous substance tend to escape either through the insect port 32 or through the vent port 34.

It will also be apparent that the position of the intake port 37 prevents the substance level rising above the upper level of the "normal" reservoir.

In addition to preventing the poisonous contents from gravitating outward through the insect port 32 or the vent passage 35, it is desirable to preclude any substantial splashing of the poisonous substance through the insect port or vent passage when the container is moved in an irregular manner or is shaken by a child handling the container as a plaything. It is also desirable to preclude the possibility of a stick, twig, or other elongated object being inserted through the insect port into the body of the poisonous substance. A feature of the form of my invention shown in Figs. 1 to 3 is that a single member serves the dual purpose of a splash plate and of an obstacle to block the insertion of a stick. This member shown at 39 may comprise a perforated disc spanning the interior of the container just below the insect port 32, the disc having a central imperforate portion 40 opposite the port 32 and the inner end 37 of the vent passage. This member 39 is preferably rigidly secured to the lower end of the wall 25 and snugly fits within but is not secured to the side wall 20. It will be apparent that this imperforate portion will serve as a splash plate and will divert fluid from the insect port and the vent passage whenever the container is turned from its normal position to any of its abnormal positions. It will also be apparent that any rectilinear path into the interior of the container through the insect port 32 such as would necessarily be followed by an ordinary stick will be intersected by the imperforate portion 40 of the member 39. This member also serves as a runway on which the insects may proceed from the insect port 32 to the sides of the container and thence down the side to the poisonous substance when the container is in the upright position or inverted position or may proceed directly to the poisonous substance when the container is placed on its side.

The container shown in Fig. 4 has a cylindrical body 42 and a bottom 43 forming, as before, a normal reservoir 44 lying below the normal substance level 45. The upper end of the container is closed by a top 47 that provides a re-entrant wall 48 which has the configuration of an undulating tube, the undulations or changes in direction of the tube being such that walls are presented to obstruct the insertion therethrough of any relatively straight object such as a stick. The undulating tube 48, together with the flat portion of the top 47 and the cylindrical body 42, form a secondary reservoir 49 into which the substance gravitates when the container is turned upside down. The substance level when the container is reversed is indicated at 50 so that between the level 45 and the level 50 in the vicinity of the axis of the container, there will be a central space that will always lie above the substance level irrespective of the position of the can. It will be noted that the inner end 52 of the undulating tube 48, constituting the insect port of the container, lies in this central zone so that at no position of the container will the poisonous substance tend to flow outward through the undulating tube 48.

The container shown in Fig. 5 is similar in many respects to the two forms of my invention above described inasmuch as a cylindrical body 55, together with a bottom 56, forms a normal reservoir 57 below the normal substance level 58. The top 60 of the container provides a re-entrant wall that includes a conical portion 61 and a central tubular portion 62, the conical portion being in effect a funnel leading to the tubular portion. This construction provides an annular secondary reservoir 63 into which the poisonous content tends to gravitate when the container is turned upside down, the substance at that time seeking the level 64. The tubular portion 62 of the re-entrant wall extends centrally into the space between the levels 58 and 64 and is provided terminally with a transverse baffle plate 65 similar to the member 39, the tubular portion 62 being apertured to provide one or more insect ports 66 adjacent or near the baffle plate 65. It is clear that the baffle plate 65 will not only preclude the insertion of a stick through the tubular portion 62 into the poisonous contents of the container, but will also serve as a runway for the insects and means to divert flow from the insect port 66 when the container is turned from its normal upright disposition to an upside down position.

In the form of my invention shown in Fig. 8, we have a cylindrical metal can with cylindrical side wall 81, top and bottom walls 82 and 83, permanently soldered to the side wall, and a central tube 84 extending from the top wall 82 to the bottom wall 83, and open at each of its ends. These walls and tube define an interior chamber having the shape of a hollow cylinder. This chamber is filled with the poisonous liquid to the level indicated at 85, after the bottom wall 83 has been secured to the side wall, and prior to the soldering of the top wall 82 in position to close the chamber.

The tube 84 is provided with one or more apertures 86 midway of its length. These apertures serve to admit the insects to the interior of the container. The dimensions of the container and the diameter of the tube 84 are so related that if liquid is present within the container sufficient to fill it to the level 85 or levels therebelow, it will be below the apertures 86, whether the container be upright as shown in the drawing or inverted or disposed upon its side.

Wicks are sometimes provided within containers for dispensing poison. The wicks are immersed in the liquid at one end and disposed to project through the entry port at the other end. Wicks of this character can be used in conjunction with a container constructed in accordance with my invention. I wish it understood that the use of a wick with a container otherwise constructed in accordance with my invention and the positioning of one end of the wick in the port provided for access to the poisonous liquid provides a dispenser which is within the scope of my invention.

Fig. 10 indicates how the construction shown in Fig. 5 may be modified by substituting a conical baffle 68 for the flat baffle 65. The conical baffle 68 will preclude the admission of a stick and will also divert fluid from the inner end of the tubular portion 62 when the container is shaken or rotated to various abnormal positions.

It is within the contemplation of my invention that the containers may be filled with poisonous substance to the upper level of the normal reservoir, prior to placing the top of the container in position, after which the top may be crimped, soldered or otherwise secured to the sides of the container in substance-tight relationship. When so manufactured no air vent will be provided and the container will be discarded when it has been emptied of its contents by the insects. It is also within the contemplation of my invention that the containers may be completely assembled prior to the insertion of any poisonous substance. In that case, an air vent such as is shown in Figs. 1 to 3 will be provided, so that the container may be automatically filled to the proper level, not only initially but as often as it may be emptied by the feeding of the insects.

Preferably the ports 32 and 66 are just large enough to permit the poisonous substance, if a liquid, to pass therethrough, the size of the port being designed in relation to the surface tension of the material used as a poison. By thus making the ports as small as possible and yet permitting entrance of the ants and the insertion of the poisonous liquid, an additional means is provided for preventing any escape of the liquid when the container is overturned or rapidly shaken while in an inverted or other abnormal position. The air-intake port 37 is preferably slightly smaller than the minimum size which will permit passage therethrough of the poisonous liquid in view of the viscosity or surface tension characteristics of said liquid.

Figs. 6 and 7 show a container similar to that shown in Figs. 1 to 3, but with a separate filling funnel 71, which fits within the conical re-entrant wall 72. The side wall of the funnel is provided with a re-entrant groove 73 extending longitudinally from the top of the funnel to the lower end thereof, and terminating at 74. The lower end of the side wall of the funnel is formed with an aperture or port 75 disposed opposite the groove 73. The side wall of the lower end of the re-entrant wall 72 is formed with two apertures or ports 76 and 77 at diametrically opposite points. The port 76 registers with the lower end 74 of the groove 73 when the funnel is inserted within the re-entrant wall of the container. The port 77 similarly registers with the port 75.

One filling funnel of this construction may be used with any number of containers. When placed in position, the liquid poisonous material is poured into the funnel. The liquid finds its way through aperture 75 and port 77 into the interior of the container. Displaced air is vented through port 76 to the passage formed between the groove 73 and the adjacent portion of the wall 72, and through this passage to the outside air.

The construction of the container and funnel as thus described makes possible the convenient and ready filling of the container but prevents the introduction of liquid above the desired level. Both the container and funnel are of durable simple design lending themselves to inexpensive methods of manufacture.

The specific forms of my invention set forth herein for the purpose of disclosure and to illustrate the principles involved will suggest to those skilled in the art various changes and modifications that do not depart from my concept. I reserve the right to all such changes and modifications that come within the scope of my appended claims.

I claim as my invention:

1. A non-spillable insecticide container for poisonous substances designed to prevent access to the contents thereof except by ants, said container having: a cylindrical side wall; a bottom wall secured in liquid-tight relationship to said side wall; a top wall secured in liquid-tight relationship to said side wall, and having a relatively small central aperture; and a cylindrical tube of relatively small diameter providing a bore suitable for the entrance of an ant and rigidly secured in depending position centrally of said top with its bore in register with said aperture, the lower end of said tube communicating with the interior of the container at a location disposed in all positions of the container at levels substantially bisecting volumetrically the interior space of the container available for containing liquid, whereby there may be inserted by gravity into the container in upright position through said central tube the maximum quantity and no more than the maximum quantity of liquid which the container will hold and which will not submerge the lower end of the tube at any other position of the container.

2. A non-spillable insecticide container for poisonous substances designed to prevent access to the contents thereof except by ants, said container having: a cylindrical side wall; a bottom wall secured in liquid-tight relationship to said side wall; a top wall secured in liquid-tight relationship to said side wall, and having a relatively small central aperture; and a cylindrical longitudinally non-rectilinear tube open at each end and of relatively small diameter providing a bore suitable for the entrance of an ant and rigidly secured in depending position centrally of said top with its bore in register with said aperture, said tube extending inwardly to a point disposed in all positions of the container at levels substantially bisecting volumetrically the interior space of the container.

3. A non-spillable insecticide container for poisonous substances designed to prevent access to the contents thereof except by ants, said container having: a cylindrical side wall; a bottom wall secured in liquid-tight relationship to said side wall; a top wall secured in liquid-tight relationship to said side wall, and having a relatively small central aperture; and a cylindrical longitudinally tortuous tube open at each end and of relatively small diameter providing a bore suitable for the entrance of an ant and rigidly secured in depending position centrally of said top with its bore in registry with said aperture, said tube extending inwardly to a point disposed in all positions of the container at levels substantially bisecting volumetrically the interior space of the container.

4. A non-spillable insecticide container for poisonous substances designed to prevent access to the contents thereof except by insects, said container having: a wall structure, the parts of which are secured together in liquid-tight manner; and an inward extension secured to said wall structure providing a substance-free passageway for insects from the interior to the exterior of said container, said passageway being provided with a port communicating with the interior of said container and disposed substantially centrally of said container at a point such that at all positions of the container a horizontal plane passing through the lowermost wall of said port defines a space of substantially constant volume available for liquid between said plane and the wall structure of the container below said plane, whereby there may be inserted by gravity through said passageway into the container the maximum quantity and no more than the maximum quantity of liquid which the container will hold and which will not submerge said port at any position of the container.

HAROLD MOORE.